W. M. POTTER.
SAW SET.
APPLICATION FILED DEC. 28, 1901.
898,780
Patented Sept. 15, 1908.
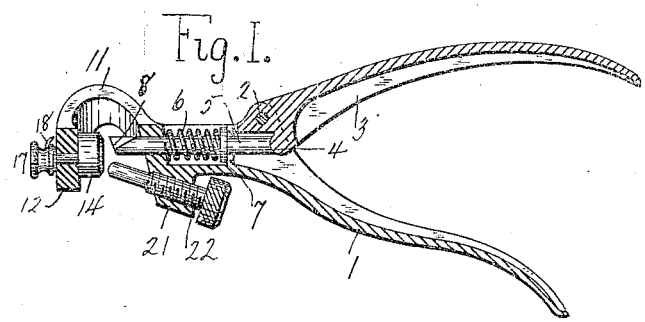
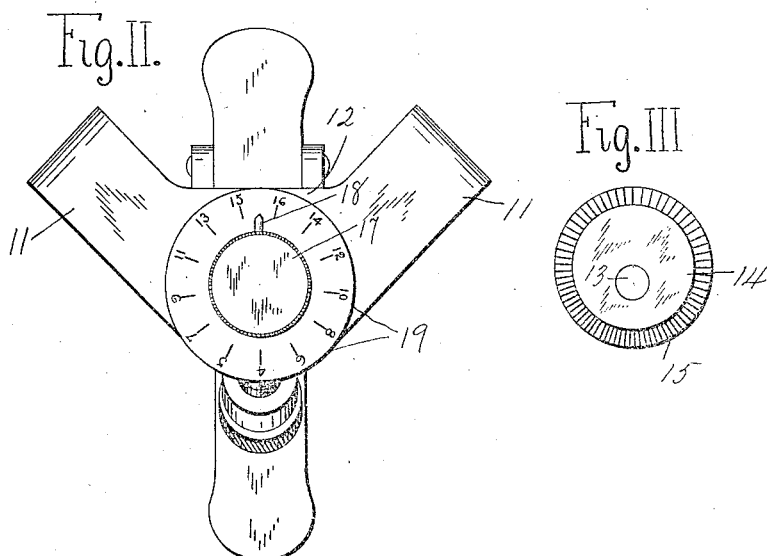
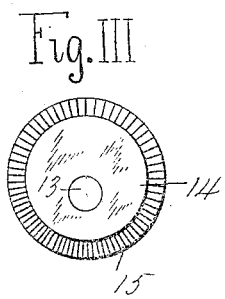
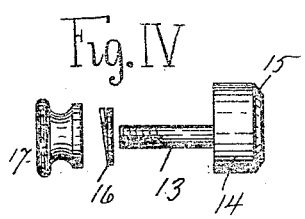
WITNESSES:
C. C. Schorneck
Helen M. Woods
INVENTOR
William M. Potter
BY Alfred Wilkinson
ATTORNEY.

UNITED STATES PATENT OFFICE.

WILLIAM M. POTTER, OF SYRACUSE, NEW YORK, ASSIGNOR TO E. C. STEARNS & CO., OF SYRACUSE, NEW YORK.

SAW-SET.

No. 898,780.  Specification of Letters Patent.  Patented Sept. 15, 1908.

Application filed December 28, 1901. Serial No. 87,570.

*To all whom it may concern:*

Be it known that I, WILLIAM M. POTTER, of Syracuse, in the county of Onondaga, in the State of New York, have invented new and useful Improvements in Saw-Sets, of which the following, taken in connection with the accompanying drawing, is a full, clear, and exact description.

My invention relates to improvements in saw-sets and has for its object to simplify the construction and diminish the cost.

It relates particularly to forming the anvil with an operative surface of uniform width and inclination, and supporting it eccentrically in the head so that, as it is rotated, the portion of the inclined surface adapted to engage with the saw teeth is at a greater or less distance from the arms of the head which fix the position of the saw during setting.

My invention will be understood by reference to the drawing herewith, in which the reference numerals of the specification indicate the corresponding parts in all the figures.

Figure I shows my saw-set in longitudinal section. Fig. II is a front elevation substantially of full size. Fig. III is a rear elevation of the anvil. Fig. IV is a side elevation of the anvil, its shank, nut and split washer.

In the figures 1 indicates the main stock to which is journaled at 2 the lever 3 having the curved lug 4 to engage with the plunger 5 fitted to the stock and held back by a spring 6 bearing against its integral collar 7; the plunger has inclined tip 8 to engage with the teeth and force or set them against the operative surface 15 of the anvil 14; 11 are integral arms on the stock curved outwardly to receive the saw and uniting in the head 12 in which is eccentrically journaled, on its pin 13, the anvil 14 having its rear edge 15 uniformly beveled. The anvil is retained in position by a split washer 16 and knurled nut 17, carrying the pointer 18, which may be set to point to the desired number on the dial face 19 corresponding to the number of teeth to the inch in the saw. When the parts have been assembled by turning the nut up the proper distance on the thread of pin 13, the end of said pin is upset against the nut, uniting them firmly. To the lower extension 21 on the stock is fitted the set screw 22.

The numerals on the dial correspond respectively to the number of teeth to the inch in saws of various sizes, so that the tool may be used for setting saws of a large range, as here indicated, from the larger size having four teeth to the inch, to the smaller size having 16. The tool is instantly adjustable for the particular saw in question, by turning the nut till the pointer points to the number indicating the size of said saw, that is, the number of its teeth to the inch, which brings the anvil into correct position.

The anvil of my peculiar construction and arrangement is quickly and easily cut and is maintained firmly in position without complicated springs or locking device.

In operation the anvil is rotated until the pointer indicates the number on the dial corresponding to the number of teeth to the inch in the saw to be set. The saw is then placed in the usual manner with its side flat against the plain surface of the anvil and its teeth in contact with the inner or lower edges of the arms 11, the set screw is then turned up to engage with the saw and maintain it in this position. The alternate teeth are then set by being forced against the operative surface by means of the inclined tip of the plunger. Half being set in this way, the saw is reversed and the other alternate teeth are set in the opposite direction. As shown in Fig. I, the anvil is arranged for the smallest teeth, only a small portion of the plunger tip engaging with them to force them against the inclined surface, the object being to set the teeth by bending them substantially at their bases. When a saw having longer teeth is to be set, the anvil is rotated increasing the distance between its inclined surface and the arms to correspond to the length of the teeth, which are then set or bent by engagement therewith of a greater portion of the plunger tip—the points of the teeth extending more or less above the anvil and out of contact with its inclined surface which is not objectionable.

Having thus described my invention what I claim as new and desire to secure by Letters Patent, is:—

In a saw-set, a rotary eccentrically pivoted anvil provided with a concentric beveled anvil-face in combination with a setting device to coöperate with the said beveled face, substantially as shown and described.

In testimony whereof, I have hereunto signed my name.

WILLIAM M. POTTER. [L. S.]

Witnesses:
C. C. SCHOENECK,
N. E. FRIEND.